United States Patent [19]

Shimizu

[11] Patent Number: 4,719,396
[45] Date of Patent: Jan. 12, 1988

[54] ELECTRIC MOTOR DRIVE CIRCUIT FOR ELECTRIC POWER STEERING SYSTEMS FOR VEHICLES

[75] Inventor: Yasuo Shimizu, Tochigi, Japan

[73] Assignee: Honda Giken Kogyo Kabushiki Kaisha, Tokyo, Japan

[21] Appl. No.: 866,504

[22] Filed: May 23, 1986

[30] Foreign Application Priority Data

May 27, 1985 [JP] Japan .................... 60-113498

[51] Int. Cl.$^4$ .................... B62D 5/04; H02P 1/22
[52] U.S. Cl. .................... 318/432; 318/293; 318/488; 180/6.44; 180/6.5
[58] Field of Search .............. 318/280, 432, 287, 288, 318/289, 291, 293, 294, 256, 268, 345 B, 345 F, 488, 489, 599, 400, 5, 800; 74/388 R, 388 PS; 180/6.2, 6.28, 6.44, 6.48, 6.5, 79.1, 142, 145; 363/132, 136

[56] References Cited

U.S. PATENT DOCUMENTS

| | | | |
|---|---|---|---|
| 4,275,340 | 6/1981 | Schleupen | 318/280 |
| 4,454,454 | 6/1984 | Valentine | 318/257 X |
| 4,523,134 | 6/1985 | Kinoshita et al. | 318/599 X |
| 4,538,698 | 9/1985 | Hashimoto et al. | 180/143 X |
| 4,544,869 | 10/1985 | Pittaway | 318/293 |
| 4,568,863 | 2/1986 | Rouf | 318/293 X |

FOREIGN PATENT DOCUMENTS

| | | | |
|---|---|---|---|
| 57-99468 | 6/1982 | Japan | 180/142 |
| 60-148397 | 8/1985 | Japan | 318/293 |
| 2132950 | 7/1984 | United Kingdom . | |
| 2145678 | 4/1985 | United Kingdom . | |

*Primary Examiner*—Bentsu Ro
*Attorney, Agent, or Firm*—Armstrong, Nikaido, Marmelstein & Kubovcik

[57] ABSTRACT

An electric motor drive circuit (9; 209) in an electric power steering system (50) for vehicles includes a control mechanism (8, 9a) for producing a control signal ($T_2$, $T_3$, $T_4$, $T_5$) for controlling an electric motor (7) to produce auxiliary torque to be supplied to an output shaft (4), taking into consideration an output signal ($S_1$, $S_2$) from a steering torque detection mechanism (3) to detect steering torque (Ts) acting on an input shaft (1). The electric motor drive circuit (9; 209) is for controlling the electric motor (7) by receiving the control signal ($T_2$, $T_3$, $T_4$, $T_5$) from the control mechanism (8, 9a). The electric motor drive circuit (9; 209) comprises a bridge circuit (60) having between input terminals (61, 62) thereof an electric power (26) connected thereto and between output terminals (63, 64) thereof the electric motor (7) connected thereto. The bridge circuit (60) consisting of four FET's (30a, 30b, 31a, 31b) arranged in pairs (30a, 30b and 31a, 31b) respectively constituting opposite bridge sides, each pair (30a, 30b and 31a30b) having one FET (30a, 31a) thereof on-driven with the control signal ($T_4$, $T_5$) from the control mechanism (8, 9a) and the other FET (30b, 31b) thereof PWM-driven with the control signal ($T_2$, $T_3$).

4 Claims, 7 Drawing Figures

ELECTRIC MOTOR DRIVE CIRCUIT FOR ELECTRIC POWER STEERING SYSTEMS FOR VEHICLES

BACKGROUND OF THE INVENTION

1. Field of the Invention

The present invention generally relates to an electric motor drive circuit. More particularly, the invention relates to an electric motor drive circuit for electric power steering systems for vehicles of the type in which auxiliary steering torque is produced by means of a steering servo device using an electric motor.

2. Description of Relevant Art

In view of problems in hydraulic power steering systems such as that the structure thereof is complicated, in recent years a variety of electric power steering systems for vehicles have been proposed.

As an example, one of them is disclosed in UK Patent Application Publication No. GB A No. 2132950, published July 18, 1984.

According to this UK publication, an electric power steering system for vehicles includes an input shaft as a steering shaft connected to a steering wheel, an output shaft interconnected through a universal joint with the input shaft and through a rack and pinion type gear mechanism with a tie rod of driven wheels, an electric motor for supplying auxiliary torque through a reduction gearing to the output shaft, a torque detection mechanism disposed on the input shaft to detect steering torque acting on the input shaft, an electric motor drive circuit for driving the electric motor, and a control circuit for feeding a control signal to the electric motor drive circuit in dependence on a detection signal from the torque detection mechanism.

The electric motor drive circuit above consists of four bipolar type transistors constituting a bridge circuit, and has two functions of controlling the direction of rotation of the electric motor and supplying electric power. Of the bridge circuit, between input terminals there is connected an electric power circuit and, on the other hand, between output terminals is connected the electric motor, and respective bases of the transistors are connected to the side of output terminals of the control circuit. Moreover, the electric motor drive circuit is adapted such that, of the transistors which are arranged in pairs opposing each other in the bridge circuit, either pair has one transistor thereof driven on and the other transistor fed with a PWM signal as a rectangular pulse signal modulated of duration, whereby a voltage of an intended magnitude and polarity is transmitted to the electric motor.

In the electric power steering system with a constitution, when the steering wheel is steered, the output shaft is supplied with adequate auxiliary torque from the electric motor, so that the steering operation is facilitated.

However, in electric motor drive circuits for electric power steering systems for vehicles of such a conventional type as described, a bridge circuit is composed of bipolar type transistors and hence, when driving an electric motor in a PWM manner, oscillatory sounds are generated at oscillation frequencies within an audible range. Moreover, bipolar type transistors are not so high of amplification factor and thus employed by way of a Darlington connection and, therefore, the saturation voltage between collector and emitter is rendered relatively high, resulting in a relatively large power loss. Further, since in general the voltage of a vehicle-mounted battery is as low as 12 V, it is unfavorable to render the saturation voltage high. Furthermore, for the impedance of bipolar type transistors is not so high, there is the problem of an increase in current capacity, with attendant problems such as that the system becomes large in size and thus high in cost.

With such points in mind, the present invention has been achieved to effectively solve problems in conventional electric motor drive circuits for electric power steering systems for vehicles.

SUMMARY OF THE INVENTION

An object of the present invention is to provide an electric motor drive circuit for electric power steering systems for vehicles, which is permitted to avoid, when driving an electric motor in a PWM manner, having oscillatory sounds generated at oscillation frequencies within an audible range, to decrease electric power loss, and to sufficiently function even with a vehicle-mounted battery of a relatively low voltage, thereby avoiding scale-up and cost-up of the system itself.

To achieve such an object, the present invention provides an electric motor drive circuit in an electric power steering system for vehicles including an input shaft operatively connected to a steering wheel, an output shaft operatively connected to a steered wheel, an electric motor for operatively supplying auxiliary torque to the output shaft, a torque detecting means for detecting steering torque acting on the input shaft, and a control means for producing a control signal for controlling the electric motor in dependence on a detection signal from the torque detecting means. The electric motor drive circuit is for controlling the electric motor by receiving the control signal from the control means. The electric motor drive circuit comprises a bridge circuit having between input terminals thereof an electric power connected thereto and between output terminals thereof the electric motor connected thereto. The bridge circuit consists of four FET's arranged in pairs respectively constituting opposite bridge sides, each pair having one FET thereof on-driven with the control signal from the control means and the other FET thereof PWM-driven with the control signal.

The above and further features, objects, and advantages of the present invention will more fully appear from the following detailed description of the preferred embodiment of the invention when the same is read in conjunction with the accompanying drawings.

DETAILED DESCRIPTION OF THE PREFERRED EMBODIMENT

Figure 1:
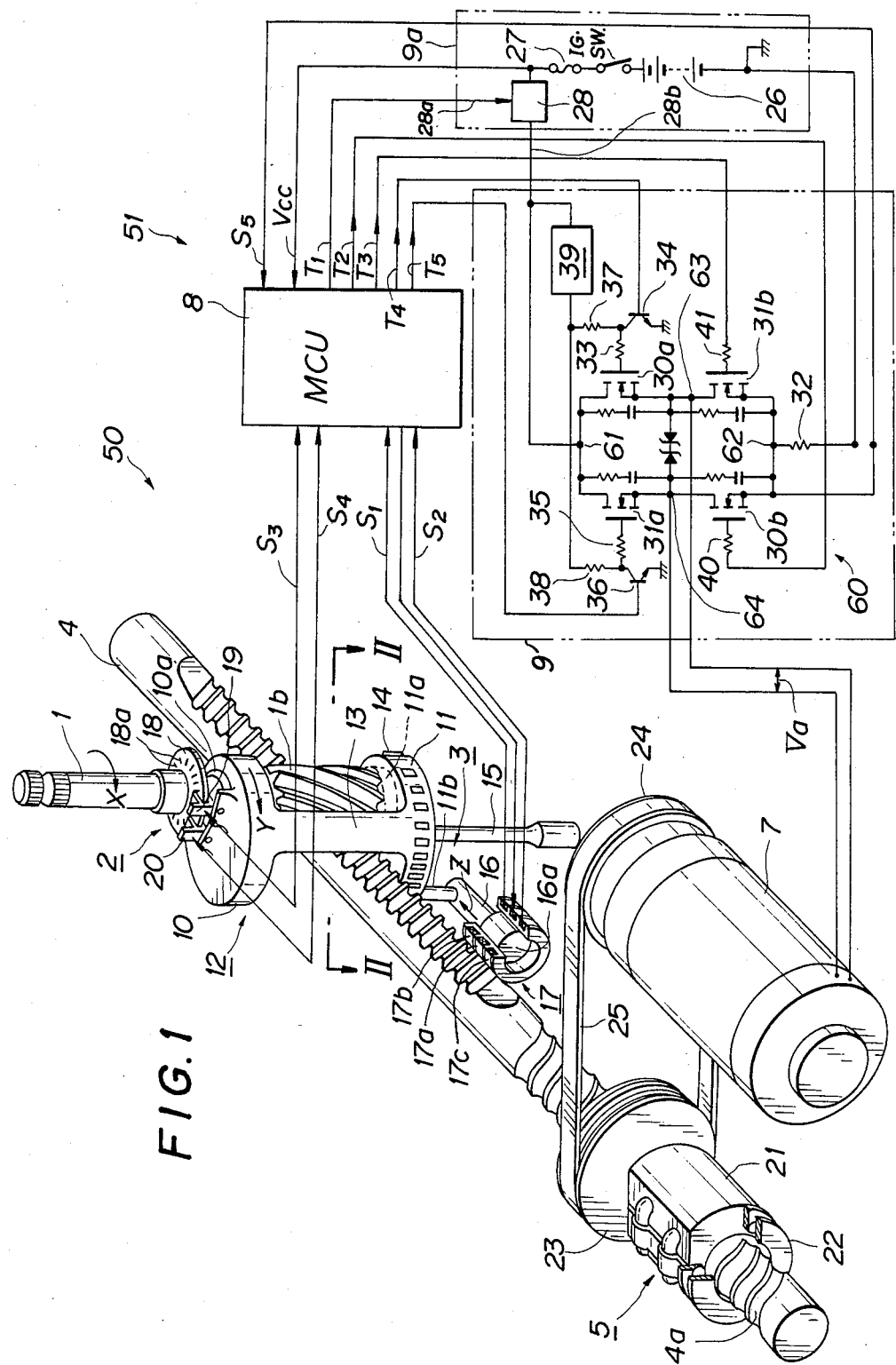
FIG. 1 is a constitutional representation of the entirety of an electric power steering system for vehicles equipped with an electric motor drive circuit according to a first embodiment of the present invention.

Referring first to FIG. 1, designated at reference numeral 50 is the entirety of an electric power steering system for vehicles according to a preferred embodiment of the present invention. Moreover, in FIG. 1, designated at reference numeral 1 is an input shaft, 2 is a steering velocity detection mechanism, 3 is a steering torque detection mechanism, 4 is a rack shaft, 5 is a ball recirculating nut (a ball screw), 7 is an electric motor, 8 is a microcomputer unit (hereinafter called "MCU"), 9 is an electric motor drive circuit, and 9a is an electric power circuit. The rack shaft 4 is interconnected at both ends thereof through unshown ball joints, tie rods, and knuckles with unshown steered wheels, respectively. The MCU 8 includes unshown necessary I/O ports, memories, and operation and control parts.

The input shaft 1 has at one end thereof a steering wheel (not shown) connected thereto through a universal joint (not shown) and at the other end a pinion gear 1b integrally joined thereto. The pinion gear 1b is provided with a pinion holder 12 fixed to both axial ends thereof through a pair of bearings 10a, 11a, respectively. The pinion holder 12 comprises upper and lower cylindrical plates 10, 11 concentric with each other and left and right studs 13 for integrally interconnecting the upper and lower plates 10, 11 with each other. The bearings 10a, 11a are attached to the upper and lower cylindrical plates 10, 11, at off-set points relative to the centers of the plates 10, 11, respectively. Moreover, the pinion holders 12 is supported by means of a needle bearing 14 so as to be rotatable relative to a rack case (not shown) fixed to a vehicle body frame (not shown). The lower cylindrical plate 11 has secured to the center of the bottom surface thereof the upper end of a vertical directed torsion bear 15. The torsion bear 15 is further secured at the lower end thereof to the rack case.

By such an arrangement, the upper and lower cylindrical plates 10, 11 and hence the pinion holder 12 are to be rotatable about the axis of the torsion bar 15. On the other hand, the input shaft 1, which is attached to the pinion holder 12 through the bearings 10a, 11a, is to be rotatable with rotation of the holder 12, that is, integrally with the holder 12, except for rotary motion of the shaft 1 about its own axis. In this respect, associated displacements of the axis of the input shaft 1 are absorbed by the aforementioned universal joint.

Further, the lower cylindrical plate 11 has on the bottom surface thereof a pin 11b downwardly projected therefrom at a point that is set slightly off from the center of rotation of the pinion holder 12 in a direction substantially symmetrical to the axis position of the input shaft 1 with respect to the rotation center of the holder 12. The pin 11b is joined at the lower end thereof to one end of a nonmagnetic mobile core 16 arranged to be perpendicular to the pin 11b and parallel with the rack shaft 4. The mobile core 16 has at the other end a cylindrical magnetic part 16a. The magnetic part 16a of the mobile core 16 is axially movably loose-fitted in a cylindrical coil part 17 integrally fixed to the rack case, and is to cooperate with the coil part 17 to constitute a differential transformer 16-17. Accordingly, as the pinion holder 12 rotates about the axis of the torsion bar 15, the circumferential displacement of the holder 12 is converted into an axial displacement of the mobile core 16, which axial displacement in turn is output as an electric signal from the differential transformer 16-17.

Figure 2:
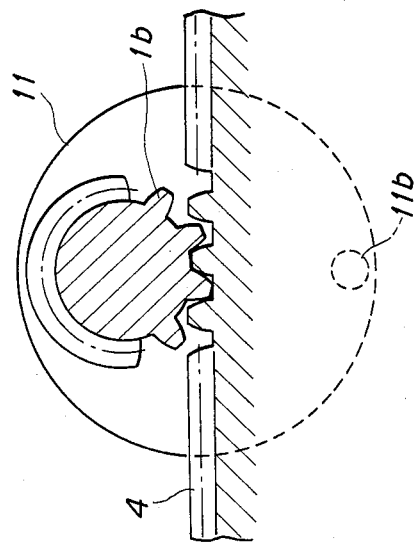
FIG. 2 is a cross-sectional view along line II—II of FIG. 1.

As shown in FIG. 2, the rack shaft 4 is meshed with the pinion gear 1b, so that the rotational displacement of the input shaft 1 is converted into an axial displacement of the rack shaft 4.

In this respect, when the input shaft 1 is forced to rotate by a steering operation, thereby causing the pinion gear 1b to rotate, if a large load is imposed on the rack shaft 4 from the steered wheel side, the engagement between teeth of the pinon gear 1b and a toothed portion of the rack shaft 4 has an increased tendency to prevent the pinion gear 1b from making a complete rotation about its own axis, that is, to cause the pinion gear 1b to make not only a rotation about its own axis but also a revolution about the rotation center of the pinion holder 12. Keeping pace with the revolution of the pinion gear 1b, the pinion holder 12 also is caused to rotate about the axis of the torsion bar 15. With such a rotation of the pinion holder 12, the pin 11b on the bottom surface of the lower cylindrical plate 11 is displaced in tangential directions of the plate 11, so that the mobile core 16 is displaced in the axial direction thereof.

For example, in a case where steering torque Ts is exerted in the direction of arrow X in FIG. 1, thereby forcing the input shaft 1 to clockwise rotate when viewed from the steerng wheel side, the pinion holder 12 is caused to rotate in the direction of arrow Y, accompanying a twist of the torsion bar 15, in accordance with the magnitude of the steering torque Ts. The circumferential displacement of the holder 12 to be then observed is in proportion to the magnitude of the steering torque Ts acting on the input shaft 1. Moreover, the circumferential displacement of the holder 12 is converted, through the pin 11b, into a displacement in an axial direction Z of the mobile core 16. In other words, an axial displacement of the mobile core 16 is then in proportion to the steering torque Ts, which axial displacement is detected at the coil part 17. To the contrary, in a case where steering torque Ts has a tendency to rotate counterclockwise when viewed from the steering wheel side, is applied to the input shaft 1, the input shaft 1, the pinion holder 12, and the mobile core 16 are caused to move in opposite directions of the aforementioned directions X, Y, and Z, respectively. The spring constant of the torsion bar 15 itself is set relatively large and, hence, the rotation angle range of the pinion holder 12 is not so large.

The steering torque detection mechanism 3 consists of the pinion gear 1b, the rack shaft 4, the pinion holder 12, the pin 11b, and the differential transformer 16-17 (the mobile core 16 and the coil part 17), and is to detect the magnitude and direction of the steering torque Ts acting on the input shaft 1.

To the input shaft 1 there is integrally attached a circular light-shielding plate 18 having a plurality of circumferentially equi-spaced slits 18a formed therethrough with the same width, respectively; and a pair of photocouplers 19, 20 each respectively laterally straddlingly set to the light-shielding plate 18 are integrally fixed to the pinion holder 12. Each of the photo-couplers 19, 20 consists of an LED (not shown) disposed on the upside of the light-shielding plate 18 and a phototransistor (not shown) disposed on the downside of the plate 18 at a point opposite to the LED. The photo-transistor is to detect a beam of light from the cooperating LED, as it is intermittently sent through any of the slits 18a of the light-shielding plate 18, to thereby output a pulse-like electric signal that is designated by reference character $S_3$ for the photo-coupler 19 and by $S_4$ for the photo-coupler 20. Moreover, the photo-couplers 19, 20 are set at such positions relative to each other that, as the circular light-shielding plate 18 rotates, the pulse-like detection signals $S_3$, $S_4$ have phases thereof shifted by one-fourth period from each other. Then, the MCU 8 is to determine the magnitude and direction of an instantaneous steering velocity Ns in dependence on the detection signals $S_3$, $S_4$ from the steering velocity detection mechanism 2. In this respect, the architecture of a program to be prepared for the MCU 8 to determine the steering velocity Ns from the detection signals $S_3$, $S_4$, as well as the constitution of the steering velocity detection mechanism 2, may preferably be similar to that employed in the copending U.S. patent application No. 827,687, filed on Feb. 10, 1986, by the present applicant.

Further, at one end part of the rack shaft 4, there is formed a bolt portion 4a having spiral grooves of a semicircular section formed in the outer circumference thereof. On the bolt portion 4a is fitted a nut 21 having spiral grooves (not shown) of a semi-circular section formed in the inner circumference thereof. And, balls (not shown) are interposed between the spiral grooves of the bolt portion 4a and the nut 21. With the bolt portion 4a, the nut 21, and the balls there is constituted the ball screw 5.

The nut 21 is provided at one end thereof with a thrust bearing 22 fixed to the aforementioned rack case, and has at the other end a pulley 23 integrally joined therto, the pulley 23 having grooves of a V-shaped section formed along the outer circumference thereof. On the end face of the pulley 23 there also is provided a thrust bearing (not shown) fixed to the rack case, so that the nut 21 is rotatably, but axially non-slidably, supported relative to the rack case.

On the other hand, also on the rotary shaft of the electric motor 7, there is provided a pulley 24 having grooves of a V-shaped section formed along the outer circumference thereof. Between and over this pulley 24 and the pulley 23, there is stretched a V belt 25 for driving the power transmission therebetween. The electric motor 7 is supported to the vehicle body through an elastic member (not shown) functioning as a vibration absorber. Accordingly, the rotation of the electric motor 7 is transmitted through the pulley 24 and the V belt 25 to the pulley 23 of the ball screw 5, thereby rotating the nut 21, thus causing the rack shaft 4 to be axially displaced. In this respect, the ball screw 5 is to permit the rack shaft 4, when caused by the pinion gear 1b, to axially move even while the ball screw 5 is not rotated.

Further, with the MCU 8 and the power circuit 9a, a control circuit 51 of the electric motor drive circuit 9 is constituted. Then, to the photo-couplers 19, 20, electric power from the power circuit 9a is supplied through the MCU 8 and a power line (not shown), and the output signals $S_3$, $S_4$ of the photo-couplers 19, 20 are input to the MCU 8. Moreover, to a primary coil 17a of the middle of the coil part 17 of the differential transformer 16-17, a frequency-constant pulse signal of a predetermined level is fed from the MCU 8, and the aforementioned electric signal from the transformer 16-17 is input to the MCU 8, which electric signal comprises a pair of signals $S_1$, $S_2$ output from a pair of secondary coils 17b, 17c disposed at both sides of the primary coil 17a, respectively.

The power circuit 9a includes a normally-closed relay circuit 28, which is installed in a power line led out from a positive (+) terminal of a vehicle-mounted battery 26 through an ignition switch IG.SW. and a fuse 27. The relay circuit 28 is to be on-off controlled with a control signal $T_1$ input to a control terminal 28a thereof from the MCU 8, and electric power from an output terminal 28b of the relay circuit 28 is supplied to the electric motor drive circuit 9. Thus, while the ignition switch IG.SW. is turned on, the MCU 8 is put in an energized state thereof, where it is permitted to process the respective input signals $S_1$ to $S_4$ as well as another input signal $S_5$ thereof, following a program stored in the memory, to output control signals $T_2$, $T_3$, $T_4$, and $T_5$ to be used for driving the electric motor 7 to the electric motor drive circuit 9, to thereby control the driving of the motor 7. In those control signals, $T_4$ and $T_5$ are clockwise-rotation and counterclockwise-rotation representative signals that are responsible for determining the terminal polarity of an armature voltage Va to be applied to the electric motor 7 in correspondence to the steering direction of the input shaft 1, respectively, and $T_2$ $T_3$ are voltage control signals in the form of pulse signals that are responsible for determination of magnitude of the armature voltage Va.

The electric motor drive circuit 9 comprises a bridge circuit 60 consisting of four field effect transistors (FET) 30a, 30b, 31a, 31b of an enhancement type with an N channel. Of the four field effect transistors 30a, 30b, 31a, 31b, such two 30a, 30b and two 31a, 31b that constitute opposing sides of the bridge circuit 60 are to function in pairs, respectively, in a below-described manner. Drain terminals of field effect transistors 30a, 31a are connected to each other to provide a connection part 61 that is connected to the output terminal 28b side of the relay circuit 28, and source terminals of field effect transistors 30b, 31b are connected to each other to provide a connection part 62 that is connected through a resistor 32 to the common side (ground). The connection parts 61, 62 are thus to cooperate with each other to constitute a pair of power input terminals of the bridge circuit 60. On the other hand, a connection part 63 between field effect transistors 30a, 31b and a connection part 64 between field effect transistors 31a, 30b are to cooperate with each other to provide a pair of power output terminals of the bridge circuit 60 that are connected to the electric motor 7. Moreover, the field effect transistor 30a has a gate terminal thereof connected through a resistor 33 to the collector of an emitter-earthed transistor 34, to the base of which is input the control signal $T_4$ from the MCU 8 that takes either a "high" or a "low" signal state. Likewise, the field effect transistor 31a paired with the field effect transistor 30a has a gate terminal thereof connected through a resistor 35 to the collector of an emitter-earthed transistor 36, to the base of which is input the control signal $T_5$ from the MCU 8 that takes either a "high" or a "low" signal state. The collectors of the transistors 34, 36 are further connected through resistors 37, 38 to a booster circuit 39, respectively, which in turn is connected to the output terminal 28b side of the relay circuit 28. The booster circuit 39 is to step up about double the voltage of the battery 26, as it is supplied through the relay circuit 28, to thereby obtain a voltage to be applied as operation power to the transistors 34, 36. It thus so follows that, with the control signals $T_4$, $T_5$ given from the MCU 8, the transistors 34 or 36 is exclusively operated and, depending thereon, the field effect transistor 30a or 31a connected to the transistors 34 or 36 respectively is turned off.

Besides, to a gate terminal of the field effect transistor 30b, the control signal $T_2$ from the MCU 8 is input through a resistor 40, which signal $T_2$ is given in the form of a frequency-constant rectangular pulse signal modulated of pulse duaration. Likewise, to a gate terminal of the field effect transistor 31b, the control signal $T_3$ from the MCU 8 is input through a resistor 41, which signal $T_3$ also is given in the form of a frequency-constant rectangular pulse signal modulated of pulse duration. Then, by the modulated pulse signal $T_2$ or $T_3$, the field effect transistor 30b or 31b is exclusively driven in a PWM controlling manner.

Exemplarily, when supposing steering torque Ts of a certain magnitude clockwise acting on the input shaft 1, it so follows that, depending on the steering torque detection signals $S_1$, $S_2$ then given, the MCU 8 functions to output the clockwise-rotation representative signal $T_4$ and the counterclockwise-rotation representative signal $T_5$, as they are controlled at "high" and "low" levels respectively, and the pulse signal $T_2$, as it is controlled to have a pulse duaration corresponding to the magnitude of the steering torque Ts, and the pulse signal $T_3$, as it is controlled to be zero in pulse duaration. As a result, the transistor 34 and hence the field effect transistor 30a turn on, so that an armature current Ia is conducted through a route including the connection part 61 as one input terminal of the bridge circuit 60, the field effect transistor 30a, the connection part 63 as one output terminal of the bridge circuit 60, the electric motor 7, the connection part 64 as the other output terminal of the bridge circuit 60, the field effect transistor 30b, and the resistor 32. In such a case, the armature voltage Va to be applied to the electric motor 7 has a magnitude proportional to the pulse duration of the PWM signal $T_2$.

To the contrary, when supposing steering torque Ts of a certain magnitude counterclockwise acting on the input shaft 1, it then so follows that the MCU 8 outputs the clockwise-rotation representative signal $T_4$ at "low" level, the counterclockwise-rotation representative signal $T_5$ at "high" level, the pulse signal $T_2$ with a zero pulse duration, and the pulse signal $T_3$ with a pulse duration corresponding to the magnitude of the steering torque Ts. As a result, the transistor 36 and hence the field effect transistor 31a turn on, so that an armature current Ia is conducted through a route including one input terminal 61 of the bridge circuit 60, the field effect transistor 31a, the connection part 64 as one output terminal of the bridge circuit 60, the electric motor 7, the connection part 63 as the other output terminal of the bridge circuit 60, the field effect transistor 31b, and the resistor 32. In such a case, the armature voltage Va to be applied to the electric motor 7 has a magnitude proportional to the pulse duration of the PWM signal $T_3$.

Accordingly, the electric motor drive circuit 9 is to control the polarity of the armature voltage Va, with the rotation direction representative signals $T_4$, $T_5$ given from the MCU 8 to the transistors 34, 36, that is, to the field effect transistors 30a, 31a of the bridge circuit 60, and the magnitude of the armature voltage Va, with the PWM signals $T_2$, $T_3$ given from the MCU 8 to the field effect transistors 30b, 31b of the bridge circuit 60. Thus, the electric motor 7 is to produce such auxiliary torque that corrpesponds to steering torque Ts acting on the input shaft 1, that is, a steering operation applied to the steering wheel. The auxiliary torque is transmitted through the belt 25 and the ball screw 5 to the rack shaft 4 so as to assist the steering operation.

Further, in order to detect abnormalities of the electric motor 7, in the electric motor drive circuit 9 there is taken a voltage across the resistor 32, which is input as the detection signal $S_5$ to the MCU 8. At the MCU 8, depending on the detection signal $S_5$, a diagnosis is made to check for abnormalities of the electric motor 7 and the electric motor drive circuit 9 itself. In cases where any abnormality is detected through the detection signal $S_5$, the MCU 8 outputs the control signal $T_1$ to the relay circuit 28 in the electric power circuit 9a to thereby stop the power supply from the power circuit 9a to the electric motor drive circuit 9.

There will be described below various internal actions of the MCU 8.

Figure 3:
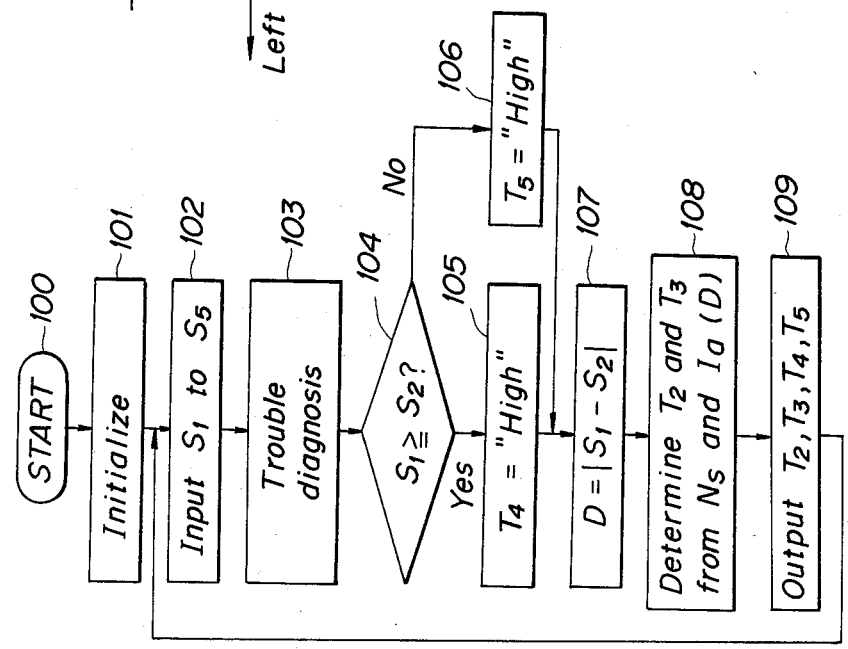
FIG. 3 is a schematic flowchart of control processes to be executed by a microcomputer unit in a control circuit of the steering system.

FIG. 3 is a flowchart showing the outline of signal processes to be executed at the MCU 8. In FIG. 3, designated at reference numerals 100 to 109 are associated process stages.

By turning on the ignition switch IG.SW., the MCU 8 as well as other associated circuitries is applied with electric power and permitted to start control functions thereof.

First, the program control flow goes to step 101 which is an initialization stage. At step 101, respective associated parameters and circuitries are initialized, as required.

Figure 4:
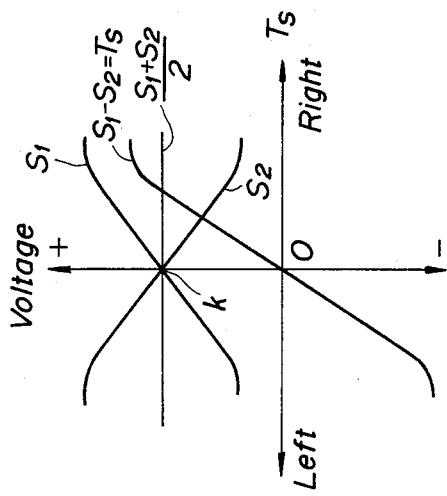
FIG. 4 is a graph for describing characteristics of a steering torque detection signal.

Next, at step 102, there are read to be stored the detection signals $S_1$ to $S_4$ from the steering torque detection signals $S_1$ to $S_4$ from the steering torque detection mechanism 3 and the steering velocity detection mechanism 2 as well as the detection signal $S_5$ from the electric motor drive circuit 9. Then, at step 103, necessary diagnoses of abnormality or trouble are made by checking whether or not the respective detection signals $S_1$ to $S_5$ are proper In this respect, while for example the differential transformer 16–17 of the steering torque detection mechanism 3 is kept in order, the detection signals $S_1 + S_2)/2$ should have such relations to steering torque Ts that are represented by FIG. 4 and, hence, half the sum of values of the detection signals $S_1$, $S_2$ should be substantially equal to a constant value k. At step 103, therefore, after a determination whether or not the difference between K and $(S_1 + S_2)/2$ is kept within a predetermined range, if the difference is not found within the predetermined range, the steering torque detection mechanism 3 should be determined to be out of order. Concerning the remaining detection signals $S_3$ to $S_5$, an occurrence of abnormality is concluded when any of their values has exceeded the limit of a normal range.

In cases where any abnormality is found by the diagnoses, the relay control signal $T_1$ is output from the MCU 8 to the relay circuit 28, thereby interrupting the power supply from the power circuit 9a to the electric motor drive circuit 9, thus stopping the control of the electric motor 7 from the MCU 8. In this respect, the ball screw 5 is, even when kept from rotation, to permit the rack shaft 4 to axially move and, therefore, under the condition that the control of the electric motor 7 from the MCU 8 is stopped, there are allowed manual steering operations to be performed without assist power.

In the case the respective detection signals $S_1$ to $S_5$ are determined to be all proper, the program goes to the next step 104 which is a decision step. At step 104, the magnitude of the detection signals $S_1$, $S_2$ from the steering torque detection mechanism 3 are compared with each other to thereby determine whether the steering direction of the steering wheel is clockwise or counterclockwise. Then, in accordance with the results of determination, it is determined which of the clockwise-rotation and counterclockwise-rotation representative control signals $T_4$, $T_5$ should be set "high".

In this respect, when the detection signal $S_1$ that represents clockwise steering torque is determined to be larger in value than the detection signal $S_2$ that represents counterclockwise steering torque, the clockwise-rotation representative signal $T_4$ is set "high" and so rendered at step 105. To the contrary, when the signal $S_1$ is not larger than the signal $S_2$, the counterclockwise-rotation representative signal $T_5$ is set "high" and so rendered at step 106.

Thereafter, at step 107, depending on the steering torque detection signals $S_1$, $S_2$, there is made a computation such that $D=|S_1-S_2|$ to thereby determine the magnitude in terms of an absolute value D of steering torque Ts.

Next, at step 108, a steering velocity Ns is determined in dependence on the detection signals $S_3$, $S_4$ from the steering velocity detection mechansim 2. Then, depending on the steering velocity Ns and the steering torque magnitude D, there are determined pulse durations of the pulse signals $T_2$, $T_3$ to thereby control the magnitude of the armature voltage Va in a later-described manner.

In this respect, when the input shaft 1 is rotated at a certain steering velocity $Ns_i$, the electric motor 7 is required to be driven at such a number $Mn_i$ of revolutions per unit time that $Nm_i=K \cdot Ns_i$, where K is a reduction ratio depending on the constitution of associated component parts such as the rack shaft 4, the ball screw 5, and the pulleys 23, 24. This will be comprehended from the arrangement of the electric motor 7 which is interconnected through the pulley 24, the belt 25, and the pulley 23 of the ball screw 5 with the rack shaft 4 that is required to be axially displaced in proportion to the speed of rotation of the input shaft 1.

Thus, a necessary rotation speed Nm of the electric motor 7 can be determined from the steering velocity Ns.

Figure 5:
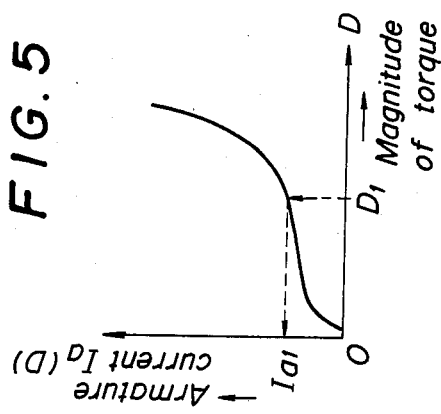
FIG. 5 is a graph showing a relation between the magnitude of steering torque and an armature current of an electric motor.

It is now advised that, in the present embodiment, necessary values of the armature current Ia are given in the form of a function Ia(D) of the steering torque magnitue D in accordance with such a relation therebetween as represented by FIG. 5.

Figure 6:
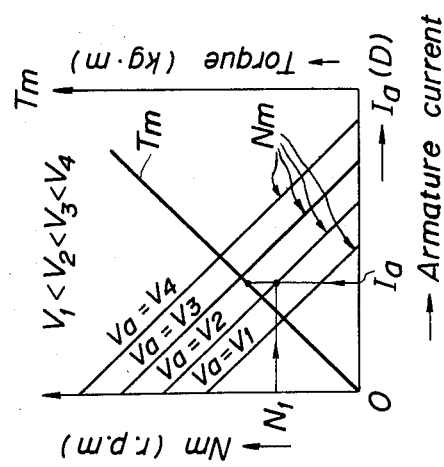
FIG. 6 is a graph showing relations between the armature current and the number of revolutions and torque of the electric motor, to thereby describe operational characteristics of the motor.

The electric motor 7 has such operational characteristics as represented by FIG. 6. As will be seen from this Figure, if the armature voltage Va to be applied to the electric motor 7 is kept constant, it then so follows that, in proportion to an increase in the magnitude of load torque Tm imposed on the motor 7, the rotation speed Nm in terms of r.p.m. of the motor 7 decreases and the armature current Ia(D) increases. Moreover, in cases where the load torque Tm is kept constant, the motor rotation speed Nm increases in or proportion to increase in the armature voltage Va, though the armature current Ia is kept constant.

As aforementioned, the necessary rotation speed Nm of the electric motor 7 can be determined from the steering velocity Ns, and the necessary armature current Ia(D), from the steering torque magnitude D. Therefore, by giving certain values to the motor rotation speed Nm and the armature current Ia(D), respectively, there can be determined a certain necessary value of the armature voltage Va.

For example, in a case where the steering torque magnitude D has a particular value $D_1$ in FIG. 5 and hence the necessary armature current Ia(D) is determined to be of a value $Ia_1$, if the necessary motor rotation speed Nm is determined to be of a value $N_1$ in FIG. 6 it then so follows that the armature voltage Va should be of a value $V_2$ in FIG. 6.

In correspondence to a thus obtained necessary value of the armature voltage Va, the aforementioned pulse durations of the pulse signals $T_2$, $T_3$ are determined.

More particularly, depending on the contents of the control signals $T_4$, $T_5$ determined at steps 105, 106, it is first determined which of the pulse signals $T_2$, $T_3$ should be modulated of pulse duaration. Then, if $T_4=$ "high" and $T_5=$ "low" for example, the pulse duration of the pulse signal $T_2$ is determined by modulation so as to be correspondent to the necessary value of the armature voltage Va and that of the pulse signal $T_3$ is determined to be continuously zero.

Next, the program goes to step 109, where the respective control signals $T_2$, $T_3$, $T_4$, $T_5$ are output from the MCU 8.

Then, at the electric motor drive circuit 9, the armature voltage Va to be applied to the electric motor 7 is controlled in a PWM manner in accordance with the direction of motor rotation representative control signals $T_4$, $T_5$ and the voltage control signals $T_2$, $T_3$, as described.

Thereafter, the program goes to step 102.

In the electric power steering system 50, the electric motor drive circuit 9 includes the bridge circuit 60 consisting of the field effect transistors 30a, 30b, 31a, 31b. As a result, the electric motor 7 is permitted to be effectively PWM-driven at frequencies exceeding an audible range and hence, when driven, it is allowed to have oscillatory sounds therefrom out of the audible frequency range. Moreover, as being relatively high of amplification factor, the field effect transistors are permitted to have a relatively low satuaration voltage in comparison with those cases which employ a conventional bridge circuit consisting of Darlington-connected bipolar transistors. Thus, the electric motor drive circuit 9 is successfully permitted to have reduced power loss, so that even a vehicle-mounted battery relatively low of output voltage can sufficiently function as a power source.

There will be described below an electric motor drive circuit 209 according to a second embodiment of the present invention.

Figure 7:
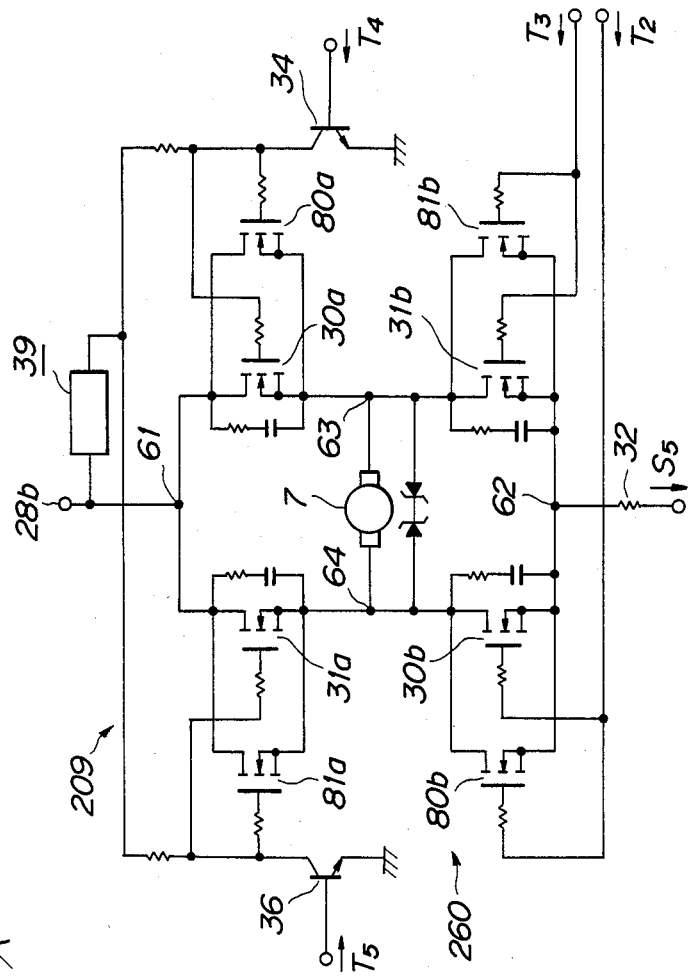
FIG. 7 is a constitutional representation of the entirety of an electric motor drive circuit according to a second embodiment of the present invention.

In the second embodiment, as shown in FIG. 7, the electric motor drive circuit 209 includes a bridge circuit 260 having parallel-connected field effect transistors small of current capacity. In conjunction with the electric motor drive circuit 9 according to the first embodiment, like parts are designated by like reference characters.

More particularly, in the electric motor drive circuit 209 of the second embodiment, in addition to respective field effect transistors 30a, 30b, 31a, 31b according to the first embodiment there are employed similar field effect transistors 80a, 80b, 81a, 81b which are parallel-connected to the former 30a, 30b, 31a, 31b by source-to-source and drain-to-drain connections therebetween, respectively. Accordingly, respective combinations of field effect transistors 30a, 80a; 30b, 80b; 31a, 81a; and 31b, 81b put in parallel to each other have a further reduced working resistance between their sources and drains, thus resulting in a further reduced power loss.

In the electric motor drive circuit 209, the four field effect transistors 30a, 30b, 31a, 31b basically constituting the bridge circuit 260 have similar field effect transistors 80a, 80b, 81a, 81b parallel-connected thereto, respectively, thereby permitting the employment of those field effect transistors which are small in size and capacity and inexpensive, while enabling increase of-current capacity. As a result, the electric motor drive circuit 209 is permitted to be provided in such a form that is further reduced in size and cost.

Although there has been described what is at present considered to be the preferred embodiment of the invention, the present invention may be embodied in other specific forms without departing from the spirit or essential characteristics thereof. The present embodiments are therefore to be considered in all respects as illustrative and not restrictive. The scope of the invention is indicated by the appended claims rather than by the foregoing description.

I claim:

1. An electric drive circuit for controlling an electric motor used in an electric power steering system for vehicles, said electric drive circuit comprising:

a bridge circuit comprising first input terminal, second input terminal, first output terminal, second output terminal, first FET, connected between said first input terminal and said first output terminal, second FET connected between said first input terminal and said second output terminal, third FET connected between said second put terminal and said second output terminal, fourth FET connected between said second input terminal and said first output terminal, and electric power connected between said first and second input terminals;

said electric motor being connected between said first and second output terminals;

control means for supplying a first control signal via a first line to said first FET to drive the same, a second control signal via a second line to said second FET to drive the same, a third control signal via a third line to said third FET to drive the same, and a fourth control signal via a fourth line to said foruth FET to drive the same; and said first and third control signals being generated concurrently with each other to drive said electric motor in a first direction, said second and fourth control signals being generated concurrently with each other to drive said electric motor in a second direction, and said first and third control signals and said second and fourth control signals being generated independently of each other;

said power steering system further comprises an input shaft operatively connected to a steering wheel, an output shaft operatively connected to a steered wheel to which said electric motor operatively supplies auxiliary torque, torque detecting means for detecting steering torque acting on said input shaft, and steering velocity detecting means for detecting steering velocity of the input shaft; and said control means generates said first, second, third and fourth control signals dependent upon detection signals from said torque detecting means and said steering speed detecting means.

2. An electric drive circuit according to claim 1 wherein:

said bridge circuit further comprises an additional four FET's each respectively connected in parallel to one of said four initial FET's and to have said control signals, as they are input from said control means to said one of said four initial FET's, likewise input thereto.

3. An electric drive circuit according to claim 1 wherein:

each of said first and second control signals is a continuous ON signal, and each of said third and fourth control signals is a PWM signal.

4. An electric drive circuit for controlling an electric motor used in an electric power steering system for vehicles, said electric drive circuit comprising:

a bridge circuit comprising first input terminal, second input terminal, first output terminal, second output terminal, first FET, connected between said first input terminal and said first output terminal, second FET connected between said first input terminal and said second output terminal, third FET connected between said second input terminal and said second output terminal, fourth FET connected between said second input terminal and said first output terminal, and electric power connected between said first and second input terminals;

said electric motor being connected between said first and second output terminals;

control means for supplying a first control signal via a first line to said first FET to drive the same, a second control signal via a second line to said second FET to drive the same, a third control signal via a third line to said third FET to drive the same, and a fourth control signal via a fourth line to said fourth FET to drive the same;

said first and third control signals being generated concurrently with each other to drive said electric motor in a first direction, said second and fourth control signals being generated concurrently with each other to drive said electric motor in a second direction, and said first and third control signals and said second and fourth control signals being generated independently of each other; and said bridge circuit further comprises an additional four FET's each respectively connected in parallel to one of said four initial FET's and to have said control signals as they are input from said control means to said one of said four initial FET's, likewise input thereto.

* * * * *